United States Patent
Blott et al.

(10) Patent No.: US 11,937,018 B2
(45) Date of Patent: Mar. 19, 2024

(54) SURVEILLANCE SYSTEM, METHOD, COMPUTER PROGRAM, STORAGE MEDIUM AND SURVEILLANCE DEVICE

(71) Applicant: Robert Bosch GmbH, Stuttgart (DE)

(72) Inventors: Gregor Blott, Salzgitter (DE); Jan Rexilius, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 17/313,764

(22) Filed: May 6, 2021

(65) Prior Publication Data
US 2021/0350143 A1    Nov. 11, 2021

(30) Foreign Application Priority Data
May 6, 2020  (DE) .......................... 102020205699.4

(51) Int. Cl.
*G06K 9/00*   (2022.01)
*G06V 20/52*  (2022.01)
*G06V 40/10*  (2022.01)
*G06V 40/20*  (2022.01)
*H04N 7/18*   (2006.01)

(52) U.S. Cl.
CPC ............. *H04N 7/181* (2013.01); *G06V 20/52* (2022.01); *G06V 40/10* (2022.01); *G06V 40/20* (2022.01); *G06V 40/23* (2022.01)

(58) Field of Classification Search
CPC ...... G06V 20/52; G06V 40/172; G06V 40/10; G06V 20/44; G06V 20/53; G06T 2207/30196; G06T 2207/30232; G06T 7/70; G06T 7/292; G06T 2207/20084; G06T 7/00; H04N 7/181; H04N 23/611; H04N 7/18; H04N 7/188; H04N 23/90; H04N 23/61
See application file for complete search history.

(56) References Cited

U.S. PATENT DOCUMENTS

| | | | |
|---|---|---|---|
| 10,353,982 B1 * | 7/2019 | Kumar | G06F 17/00 |
| 11,506,501 B2 * | 11/2022 | Hill | G06Q 30/0259 |
| 2012/0020518 A1 * | 1/2012 | Taguchi | G06T 7/292 |
| | | | 382/103 |
| 2019/0007623 A1 * | 1/2019 | Wang | H04N 7/147 |

(Continued)

FOREIGN PATENT DOCUMENTS

| | | |
|---|---|---|
| DE | 102008001126 A1 | 10/2009 |
| JP | 2007074657 A | 3/2007 |

*Primary Examiner* — Shervin K Nakhjavan
(74) *Attorney, Agent, or Firm* — Michael Best & Friedrich LLP (57) ABSTRACT

A surveillance system having an interface to a camera network for video surveillance of a surveillance area. The camera network includes a plurality of cameras each for capturing a surveillance subarea. The cameras are designed to provide surveillance images of the surveillance subareas. The surveillance system also includes a surveillance device for re-identifying people in the surveillance images. The surveillance device includes a person detection module for detecting people and an object detection module 10 for detecting objects. The surveillance device 5 includes an assignment module 12 designed to assign at least one item of object information to a person 4, and an action detection module 11 designed to detect an action of the person 4 on one of the objects 8.

12 Claims, 3 Drawing Sheets

(56) References Cited

U.S. PATENT DOCUMENTS

| | | | |
|---|---|---|---|
| 2019/0019019 A1* | 1/2019 | Nishikawa | G06T 1/0007 |
| 2019/0172039 A1* | 6/2019 | Kambara | G06Q 20/208 |
| 2019/0228457 A1* | 7/2019 | Wu | G06V 40/28 |
| 2020/0014885 A1* | 1/2020 | Carey | G08B 15/004 |
| 2020/0058000 A1* | 2/2020 | Brailovskiy | G06F 16/683 |
| 2020/0118401 A1* | 4/2020 | Zalewski | G07G 1/0072 |
| 2020/0184230 A1* | 6/2020 | Liu | G06T 7/70 |
| 2020/0364997 A1* | 11/2020 | Okamoto | G06V 40/172 |
| 2021/0192258 A1* | 6/2021 | Sabripour | G08B 13/19608 |
| 2021/0256277 A1* | 8/2021 | Yasui | G06V 20/58 |
| 2021/0256823 A1* | 8/2021 | Ito | G08B 13/19613 |
| 2021/0297630 A1* | 9/2021 | Blott | G06V 10/811 |

* cited by examiner

SURVEILLANCE SYSTEM, METHOD, COMPUTER PROGRAM, STORAGE MEDIUM AND SURVEILLANCE DEVICE

BACKGROUND OF THE INVENTION

The invention relates to a surveillance system. The invention also relates to a method, a computer program, a storage medium and a surveillance device.

Video-based surveillance and services are a key aspect in many retail applications, for instance visitor-flow analysis, anti-theft and anti-vandalism protection, etc. Modern camera systems also allow analysis of visitor traffic, for instance in order to optimize the deployment of personnel or to evaluate the impact of marketing activities. Often this also involves tracking individual people throughout the camera network, which requires re-identifying a person in different cameras. Identifying people can usually prove difficult because standard techniques for person re-identification can often be error-prone, or a person can look different in different cameras.

Document DE 102008001126 A1, which arguably constitutes the closest prior art, discloses an inventory module for a video surveillance system, which video surveillance system comprises at least one surveillance camera which is directed and/or can be directed onto a surveillance area, in particular onto a storage and/or retail area, containing products, and has a detection device designed to detect the products, which detection involves obtaining an item of position information and an item of identification information for the detected product, and comprises an assignment device, which is designed to model a spatial distribution of the products in the surveillance area by means of the position information and the identification information from a plurality of detected products. In addition, the inventory module comprises an object detection device for detecting moving objects, in particular shoppers, and comprises a correlation device designed to correlate the movement behavior of the moving objects with the arrangement of the products.

SUMMARY OF THE INVENTION

The subject of the invention is a surveillance system. The surveillance system comprises an interface to a camera network, or alternatively comprises the camera network, which is designed and/or is suitable for video surveillance of the surveillance area. The surveillance system can be distributed over a plurality of segments of the surveillance area and/or over additional areas, for instance of a central security surveillance system. The surveillance area can include an indoor and/or outdoor area. For example, the surveillance area is a public area, for instance a department store, a station, an airport or suchlike.

The camera network comprises a plurality of cameras, each designed and/or suitable for capturing a surveillance subarea of the surveillance area. The cameras can be color, monochrome and/or infrared cameras. The cameras are preferably located in the surveillance area. The surveillance subareas under surveillance by different cameras can overlap one another. Alternatively, the surveillance subareas of different cameras do not overlap. The cameras are designed to provide surveillance images of the surveillance subareas, in particular as video data.

The surveillance system comprises a surveillance device that is designed and/or suitable for re-identifying people in the surveillance images. The person re-identification can be used to re-identify a definable person to be found, and/or a plurality of people, in different surveillance images. The people to be re-identified may be individual people, groups of people, or even animals and/or objects. In particular, the surveillance device is provided with a plurality of surveillance images from different cameras. For example, the cameras and the surveillance device each have an interface, which interfaces can be interconnected for data transfer.

The surveillance device comprises a person detection module that is designed and/or suitable for detecting people in the surveillance images. For example, the surveillance device is in the form of a computer device, and the person detection module can be in the form of a hardware or software module of the surveillance device. In particular, the person detection module is designed to analyze and/or process the surveillance images. At least, or precisely, one person can be contained or be present in the surveillance images, in particular temporarily or permanently. The person detection module is designed to detect automatically on the basis of the surveillance images a person, some people and/or all the people in the surveillance images. The person detection module is designed in particular to examine the surveillance images on the basis of rules, for instance on the basis of specified parameters and/or characteristics, which parameters are designed to find people and/or to distinguish people from background. Alternatively, however, a user can also manually pick out individual people and/or all the people in the surveillance images.

The surveillance device comprises an object detection module that is designed and/or suitable for detecting objects in the surveillance images. For example, the object detection module can be in the form of an additional hardware or software module of the surveillance device. Said detection of the object involves the object detection module obtaining object information for the detected object. In particular, the object detection module is designed to perform image analysis and/or processing, preferably on the basis of digital or analog image processing algorithms, on the objects in the surveillance images in order to obtain the object information. In particular, the objects are detected, for example, by computing feature descriptors of the objects, and comparing with reference feature descriptors. In principle, the objects can be of any form, although in particular in the present case, the objects in the surveillance area are retail products. Alternatively, however, the objects can also be other products such as tools, consumables, pharmaceutical products or other stock in a storage area. Alternatively, the object may also be a returnable article, however, for instance bottles, packaging, etc. The objects are preferably positioned in a regular manner in storage structures such as shelves or the like. The surveillance area is preferably a storage and/or retail area, in particular a sales floor, for instance of a supermarket.

The surveillance device comprises an assignment module that is designed and/or suitable for assigning at least one item of object information to a person. For example, the assignment module can be in the form of an additional hardware or software module of the surveillance device. In particular, the assignment module is designed to assign a specific item of object information to precisely one person in the surveillance images. This person-specific object information preferably is assigned and/or can be assigned permanently and/or uniquely and/or fixedly to the precisely one person. The assignment module is designed to provide the surveillance images containing the detected person to whom is assigned at least, or precisely, the one item of object information.

The invention also proposes that the surveillance device comprises an action detection module that is designed and/or suitable for detecting an action of the person on one of the objects. For example, the action detection module can be in the form of an additional hardware or software module of the surveillance device. In particular, the action detection module is designed to analyze and/or evaluate movements and/or activities of the person in the surveillance images in order to detect an action being performed by the person on the object. Specifically, the action detection module is designed to use methods from the field of "action recognition" to detect the actions. The assignment module is designed to assign the at least one item of object information for an object to the person if at least one action condition is satisfied for an action on the object. In particular, the object information is assigned if the object detection module detects the object, and the action detection module at the same time and/or in the same image region detects on the object an action of the detected person that results in the action condition being satisfied. For example, the action condition may be a defined action of the person on the object and/or a change in the object information resulting from the action. The assigned object information is preferably used for the re-identification of the person in different surveillance subareas. Alternatively, or optionally additionally, however, the object information assigned to the person can also be used for the surveillance of an object distribution in the surveillance area. For example, the object information can be provided to an inventory module for this purpose.

Thus the advantage of the invention is that the action detection module can significantly improve surveillance and/or re-identification of people in the surveillance area. The assigning of object information allows the people to be provided with additional identification features, and therefore not only can the features of the actual person be used, but also the object information assigned to the individual person can be employed in and/or for the re-identification of the people. Therefore the invention is based on the consideration of facilitating improved re-identification of people in a surveillance area.

In a further embodiment, the surveillance device comprises a comparison module which is designed and/or suitable for comparing object information that is assigned to the person and is from a plurality of different, in particular at least two different, surveillance subareas. For example, the comparison module can be in the form of an additional hardware or software module of the surveillance device. The comparison module is designed to re-identify a person in the surveillance images in the event of a match for the object information from at least two surveillance subareas. For this purpose, the comparison module accesses in particular the person-specific object information, which is provided by the assignment module, in order to take into account the associated object information in comparing the people detected in the plurality of surveillance subareas. If a match exists, or a minimum match exists, then the person can be considered re-identified. Thus instead of searching in the images just for the person being sought, it is possible to use, for example, a match for the associated object information as evidence and/or an indication of the person to be re-identified.

According to a specific embodiment, the assignment module is designed to assign to a plurality of people different object information from one or more surveillance subareas. In particular, each person is assigned at least, or precisely, one item of person-specific object information from which the person can be re-identified. The comparison module is designed to compare the people on the basis of the assigned object information, wherein a person is re-identified in the event of a match for the assigned object information. In particular, a person is deemed re-identified in the surveillance images in the event of a match for at least one item, some or all of the object information assigned to the person. Preferably, the person re-identification is used to track and/or follow a person in the surveillance area and/or in one or more surveillance subareas. The tracked and/or followed person can be re-identified as precisely one person if the associated object information acquired in the different surveillance subareas matches and/or is identical. Thus the object of the invention is to use the object information assigned to the person in order to re-identify the person.

In a further embodiment, the action condition comprises an action on the object that results in the object accompanying the person across at least two different surveillance subareas. In particular, the action condition is satisfied if the person to be re-identified has been in the vicinity of the object for a prolonged period and/or performs an operation on the object and/or moves with the object. For example, the action condition is satisfied if the person takes an article from a shelf and/or places the article in an accompanying shopping trolley or basket or suchlike. Thus the object information assigned to the person is based in particular on an object that can be re-identified and is uniquely assigned to the person, and that accompanies the person across a plurality of surveillance subareas.

According to a further specific embodiment, the object information comprises at least, or precisely, one position feature of the object. The object detection module is designed in particular to locate the object in the surveillance images on the basis of the position feature. For example, the object detection module can detect a position and/or a change in position of the object in the surveillance area on the basis of the position feature. Alternatively, or optionally additionally, the object information comprises at least, or precisely, one identification feature of the object. The object detection module is designed in particular to identify the object in the surveillance images on the basis of the identification feature. For example, the identification feature describes a size and/or shape and/or color and/or type, for instance food, clothing, etc., of the object. Thus a surveillance device is proposed that is characterized by particularly reliable identification of identical or different objects in different surveillance subareas.

In a further embodiment, the assignment module is designed to assign to a person a plurality of items of object information from different surveillance subareas according to the action using the corresponding objects. The action detection module is designed in particular to assign to the person, whenever the person performs on an object an action that satisfies the action condition, an additional associated item of object information for the corresponding object. A person can preferably be assigned any number of items of object information according to the actions, on the basis of which the person can be uniquely identified and/or can be distinguished from other people. For example, a person can thus be assigned a multiplicity of items of object information over the period of time spent in the surveillance area, making it significantly easier to re-identify the person in the different surveillance subareas.

According to a development, the person detection module is designed to acquire at least, or precisely, one item of person information for the detected persons. The surveillance device is designed in particular to identify and/or re-identify the person on the basis of the assigned object information and the person information. The person information comprises in particular a person-specific feature or a feature linked to the person, specifically at least, or precisely, one abstract person-feature of the detected person. The person detection module is preferably designed to extract the person information for the detected person from the surveillance images. The person detection module is designed to provide, in particular to the comparison module, the person information for the purpose of re-identifying the person. In particular, the comparison module can analyze and/or evaluate the person information in addition to the object information.

The object information preferably has a higher priority than the person information, wherein in the event of a match for the person information, and in the event of a discrepancy in the object information, the person is not re-identified or only partially re-identified. A surveillance device is thus proposed that is characterized by particularly reliable re-identification of people in different surveillance subareas.

In a further specific implementation, the person information comprises an appearance feature and/or a clothing feature and/or a motion feature of the person. In particular, the at least one appearance feature describes a gender, hair color, skin color, facial features, height, build, etc. of the person. In particular, the at least one clothing feature describes a clothing color, type of clothing, etc. of the person. In particular, the motion feature describes a gait, speed of movement, direction of movement, etc. of the person.

A method for re-identifying people in surveillance images forms a further subject of the invention. In said method, people are detected in the surveillance images. For example, the surveillance images are captured by a camera network comprising a plurality of cameras, preferably at least, or precisely, two cameras. In a further step, objects are detected in the surveillance images, which detection of the objects involves obtaining object information for the detected object. In particular, the object information is acquired from objects arranged in the surveillance area in a regular manner. In a further step, an action of the person on an object is detected, and in the event of an action condition being satisfied, object information for the object is assigned to the person for the purpose re-identification. In particular, the object information is assigned to the person permanently or at least for the length of time the person spends in the surveillance area. Particularly preferably, the person can be assigned a plurality of items of object information for identical, different or similar objects if the action condition is satisfied for an action with the respective objects.

The assigned object information from a plurality of different surveillance subareas is preferably compared, and in the event of a match for the assigned object information from at least two different surveillance subareas, a person is re-identified in some or all of the surveillance images. In particular for this purpose, the assigned object information is acquired in at least, or precisely, two, preferably in all, surveillance subareas of the surveillance area. In particular, a person detected in the surveillance images is re-identified if the associated object information at least from a first surveillance subarea matches the associated object information from a second surveillance subarea.

In a further method step, one or more items of person information for a person, for instance specific person features of the detected person, can be extracted from the surveillance images and provided for re-identification of the person. In particular, the person information can be used in addition to the object information for the person re-identification in order to identify and/or re-identify the person in the surveillance images.

The method is preferably designed to track the person in the surveillance images on the basis of a match for the object information and/or the person information from at least two different surveillance subareas. The person in the surveillance images is preferably re-identified if at least one item of associated object information from at least two different surveillance subareas matches. In particular, the people are detected automatically in the surveillance images and followed and/or tracked over time. A person can hence be tracked and identified uniquely and seamlessly across the entire camera network.

A computer program forms a further subject of the invention, which computer program is designed to perform the method for re-identifying people when the computer program is executed on a computer, a processor unit or the surveillance device.

A storage medium forms a further subject of the invention, which storage medium comprises the computer program as described above.

A surveillance device already described above for re-identifying people in surveillance images forms a further subject of the invention, which surveillance device is preferably designed to perform the described method.

BRIEF DESCRIPTION OF THE DRAWINGS

Further advantages, effects and embodiments appear in the accompanying figures and the description thereof, in which figures.

DETAILED DESCRIPTION

Figure 1:
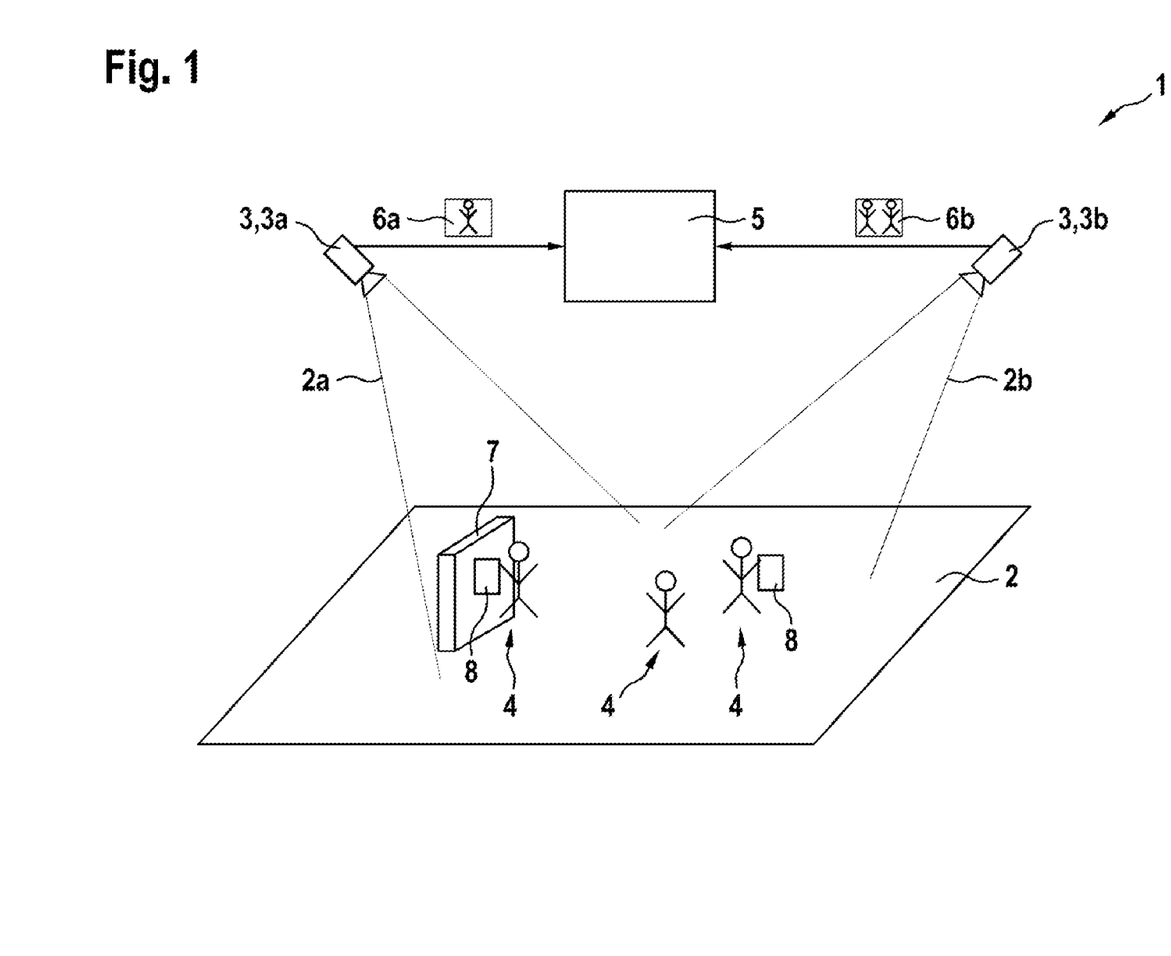
FIG. 1 shows a schematic diagram of a surveillance system comprising a surveillance device as an exemplary embodiment of the invention.

In a highly schematic representation, FIG. 1 shows a surveillance system 1 that is used for surveillance of a surveillance area 2. The surveillance system 1 comprises a camera network 3, which is designed for video surveillance of the surveillance area 2. The camera network 3 comprises for this purpose a plurality of cameras 3a, b, for example in the form of video cameras, preferably color cameras. The surveillance area 2 is formed by a sales floor, for example, and the cameras 3a, b can be installed at different positions in order to provide surveillance of different surveillance subareas 2a, b of the surveillance area 2.

The surveillance area 2 contains people 4 who can move freely there. The cameras 3a, b are likewise used for video surveillance of the people 4. The cameras 3a, b depict the respective surveillance subareas 2a, b in the form of surveillance images 6a, b, with the cameras 3a, b providing the surveillance images 6a, b as video sequences.

The surveillance system 1 comprises a surveillance device 5 which is designed to analyze and/or process the surveillance images 6a, b from the cameras 3a, b. For this purpose, the cameras 3a, b can be connected wirelessly or by means of cables to the surveillance device 5. The surveillance images 6a, b captured by the cameras 3a, b are thus routed to the surveillance device 5, where they are processed.

Located in the surveillance area 2 is a storage structure 7, for instance a plurality of shelves, in which are ranged objects 8, for example a variety of products. In particular, the objects 8 are articles that are for sale and sorted in an orderly manner in the storage structure 7.

The re-identification of people 4 plays an important role in video surveillance of sales floors or suchlike. Since the cameras 6a, b used in this context generally have to cover a large area, the resolution of an individual person 4 is low and it is not possible to use facial recognition techniques. In addition, the large variation in a person 4 in different cameras 6a, b, for instance as a result of lighting differences, different views and camera angles, etc., makes it harder to re-identify the person 4 in the surveillance images 6a, b. Algorithms from the field of artificial intelligence are known whose re-identification performance is improved over the number of training examples. Data protection regulations, however, make it difficult or practically impossible to obtain a sufficient amount of data.

It is therefore proposed to expand the current methods for appearance-based person re-identification by employing domain knowledge. This is done by integrating directly into the analysis methods the particular circumstances in specialized stores, for instance a supermarket, hardware store, clothing store, shoe shops, textile suppliers, motor-component store, etc., instead of being restricted to investigating the appearance of each individual person 4.

The surveillance device 5 is designed to re-identify people 4 in the surveillance images 6a, b from the plurality of cameras 3a, b on the basis of object information assigned to the person 4. Whereas present-day algorithms consider each person 4 per se, this approach widens to include the objects 8 and actions in the surveillance area 2 that are linked to a person 4. The surveillance device 5 is designed in this case to detect the objects 8 in the surveillance images 6a, b and to obtain an associated item of information for each of the objects 8.

Figure 2:
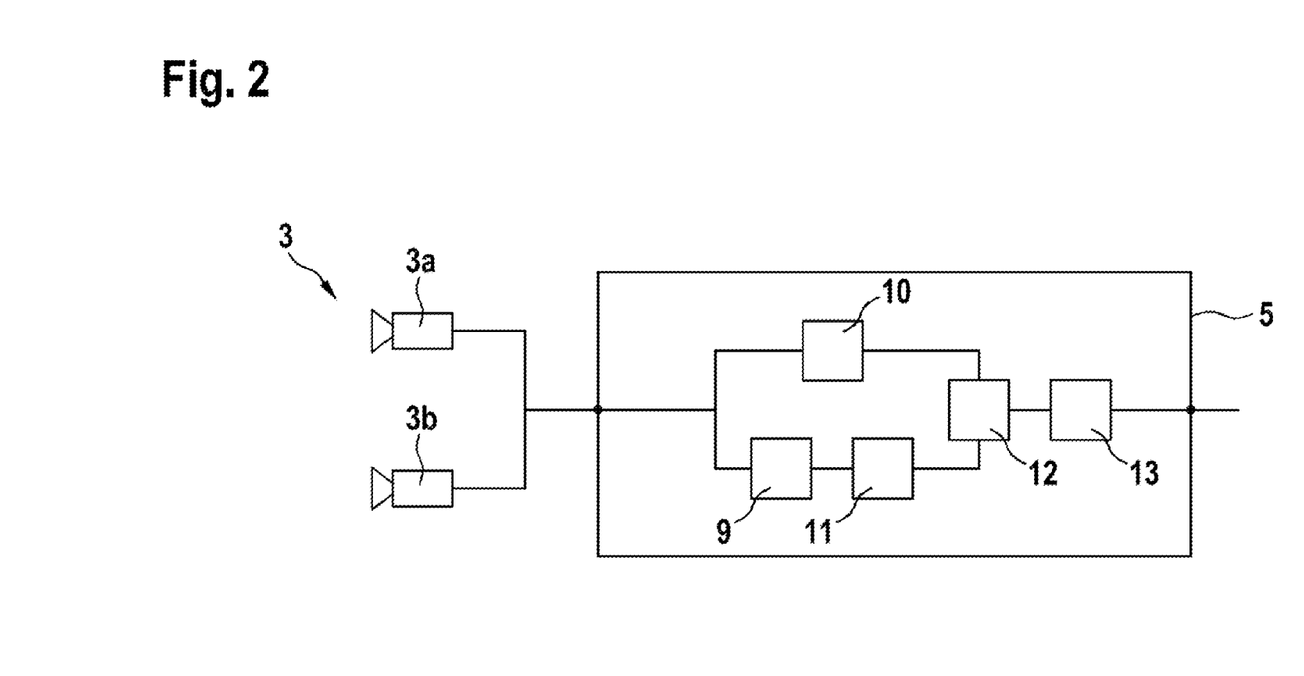
FIG. 2 shows a schematic block diagram of the surveillance system from FIG. 1.

The further processing of the surveillance images 6a, b and of the object information is explained with reference to FIG. 2, which shows a schematic block diagram of the surveillance system 1 as an exemplary embodiment of the invention.

The surveillance images 6a, b are routed from the cameras 3a, b into the surveillance device 5, where they are transferred to a person detection module 9. The person detection module 9 is designed, inter alia, to examine the surveillance images 6a, b for people 4, and to recognize detected people as such. For example, the person detection module 9 can analyze the surveillance images 6a, b for certain characteristics, and assess on the basis of a set of rules whether something is a person 4 or a thing. Alternatively or additionally, however, a user can also pick out the people 4 manually in the surveillance images 6a, b.

The surveillance device 5 comprises an object detection module 10, which object detection module 10 is likewise provided with the surveillance images 6a, b. For example, the object detection module 10 can use digital image processing algorithms, in particular video content analysis, to detect the objects 8 in the surveillance images 6a, b. Said detection of the objects 8 also involves obtaining object information, which object information can comprise a position feature and/or an identification feature of the object 8. The object detection module 10 is designed to determine a position of the associated object 8 in the surveillance area 2 on the basis of the position feature, and/or to identify the object 8 on the basis of the identification feature.

In addition, the surveillance device 5 comprises an action detection module 11, which action detection module 11 is designed to detect an action of the detected person 4 in the surveillance area 2. The action detection module 11 is used in particular to detect an action of the person 4 on the objects 8. For example, the action detection module 11 can use known methods from the field of "action recognition" to detect the actions performed by the person 4.

The surveillance device 5 comprises an assignment module 12 that is in data communication with the object detection module 10 and with the action detection module 11. Stored in the assignment module 12 is at least one action condition for the actions performed by the people 4, and the assignment module 12 is designed to assign an item of identification information to the person if the action condition is satisfied. In particular, the identification information is defined by the object information for the object 8. The action condition is defined, for example, by an action of the person 4 that results in the object 8 permanently and/or mostly accompanying said person in a defined area surrounding the person 4. Thus the object information can be understood to mean information that can be uniquely assigned to an object 8 linked to the person 4.

The action condition can be satisfied if the person 4 takes out of the storage structure 7 an object 8, for instance an article, that accompanies the person from the first into the second surveillance subarea 2a, b. Since the position of the object 8 in the surveillance region 2 is known, the selected and accompanying object 8 can also be detected and assigned to the person 4 as identification information. For example, a classification algorithm based on deep-learning methods can be used for this purpose. In particular, any number of items of identification information can be assigned to the person 4 over the entire period of time spent in the surveillance area 2. During shopping, for instance, more and more identification information is gradually added to the person 4.

The assigned identification information, in particular object information, is then provided to a comparison module 13 together with the surveillance images. The person detection module 9 can also be designed to extract one or more items of person information for the people 4, and to provide this information to the comparison module 13 as additional identification information. The comparison module 13 is designed to compare the identification information from the surveillance images 6a, b from the first and second surveillance subareas 2a, b, and in the event of a match for the identification information, a person 4 in different surveillance images 6a, b is re-identified as the same person.

Thus an improved re-identification of people 4 is proposed that takes into account extra information beyond the appearance-based re-identification. This approach offers a distinct advantage over bare data collection, because the re-identification of people 4 can be improved significantly by the addition of extra identification information.

Example scenarios are used below to describe the acquisition and use of different identification information. In a possible exemplary embodiment, a person 4, for instance a customer, selects one or more objects 8 from the storage structure 7, wherein the action detection module 11 detects an action on the object, and the assignment module 12 assigns the associated object information to the person 4 on the action condition being satisfied.

For example, the person 4 can be assigned an item of identification information if the person 4 places food, for instance fruit, milk cartons, etc. in a shopping trolley. In this case, the person 4 can be re-identified at the checkout on the basis of the accompanying foods, wherein the objects 8 placed on the belt are detected on the basis of the associated object information as the various foods that were previously put in the shopping trolley.

Alternatively, the identification information, or optionally an additional item of identification information, can be assigned to the person 4 if the person 4 at a self-service counter, such as those found in bakers or self-service bakeries, personally finds and takes out the articles. Since it is rare or forbidden for the objects 8 to be put back, the object information for the removed articles can also be used at the checkout for re-identification.

Alternatively, the identification information, or optionally an additional item of identification information, can be assigned to the person 4 if the person 4 hands over a returnable item and receives a voucher in return. At the checkout, the person 4 hands over this voucher, and this information can be used as an additional input for the re-identification.

Alternatively, the identification information, or optionally an additional item of identification information, can be assigned to the person 4 if the person 4 is located and/or spends a prolonged period inside or outside a restricted-access zone, for instance a checkout area or an area behind a counter, of the surveillance area 2. For example, only employees have access to this zone, and therefore it is possible to distinguish unambiguously between customers and employees. This identification information can be used, for example, as additional features for the re-identification. In addition, employees located in the restricted-access zones could be removed automatically from the surveillance images 6a, b in order to increase employee data protection.

Alternatively, the identification information, or optionally an additional item of identification information, can be assigned to the person 4 if the person 4 selects an object 8 having a clearly distinguishable and/or unique item of object information, for instance an article of distinctive dimensions, colors and/or low demand. If the person 4 takes a cement sack, for instance, from the storage structure 7, after scanning the article at the checkout it is known immediately that the person is highly likely the person 4 who passed through the building department and not the person 4 who passed only through the plumbing department. It is hence possible to reduce significantly ambiguities for different people 4.

Figure 3:
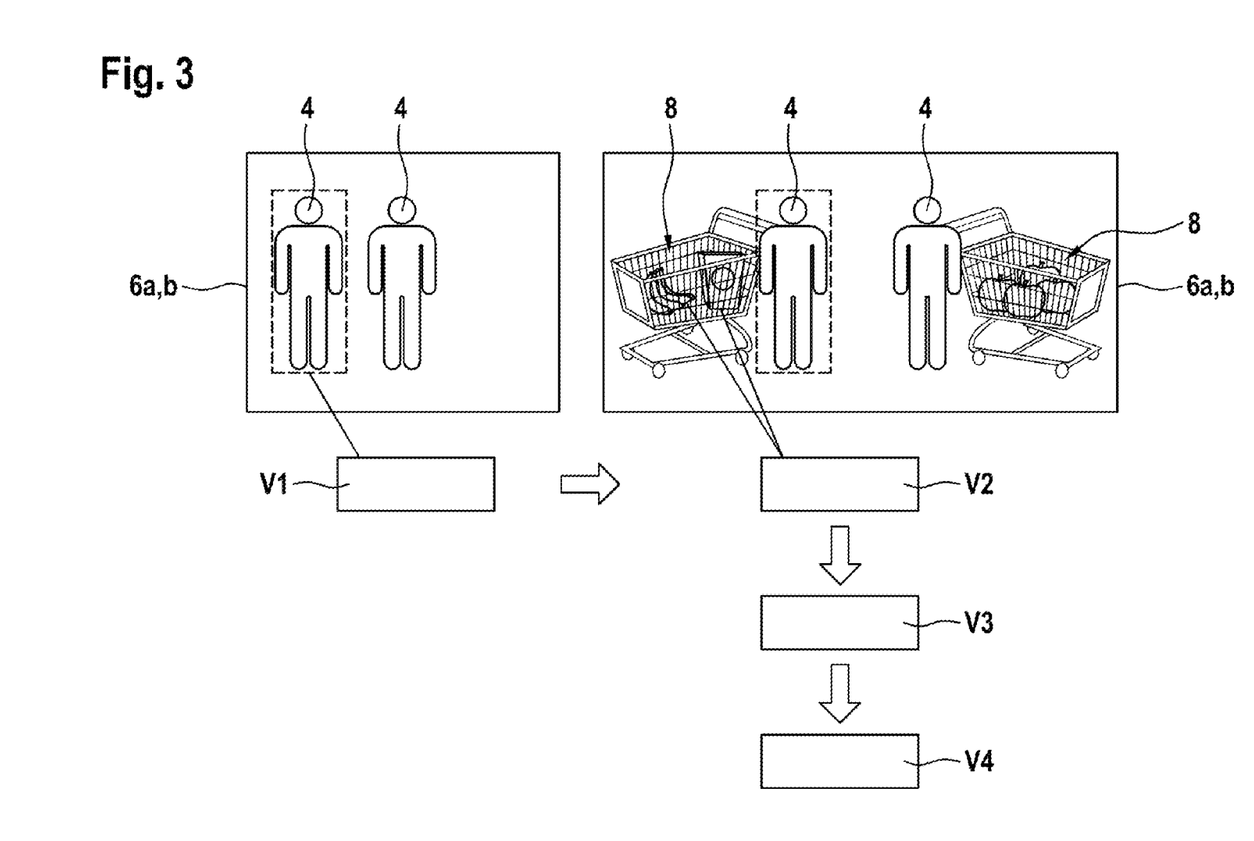
FIG. 3 shows a schematic diagram of method steps of a method.

FIG. 3 shows in a schematic diagram a method sequence for a method for re-identifying people 4 in the surveillance images 6a, b. In a first method step V1, a person 4 to be re-identified is selected in the surveillance images 6a, b. The selection can be performed here automatically, for instance using a trained detector, or manually by the user during simultaneous recording of the video material. To facilitate an efficient search, it is additionally possible to save as metadata also the results computed in the video analysis.

In a second method step V2, the actions that the person 4 performs in the store are detected and compared with a stored action condition. Methods from the field of "action recognition" can be used to detect the actions, for example. The action condition is satisfied, for instance, if the person 4 takes an object 8 which accompanies the person over a prolonged period.

On the action condition being satisfied, the person 4 is assigned, in a third method step V3, a corresponding item of information for the accompanying object 8, on the basis of which the person 4 can be re-identified. Depending on the number of accompanying objects 8, more and more identification information can thus be added gradually to the person 4, making re-identification increasingly easy.

In a fourth method step V4, the surveillance images 6a, b are compared with one another, and a person 4 is re-identified in the surveillance images 6a, b if the identification information assigned to the person 4 matches. Instead of taking account of only the person information, for instance green fabric (trousers) below and blue fabric (shirt) on top, the accompanying objects 8 are additionally identified on the basis of the object information.

The invention claimed is:

1. A surveillance system (1),
comprising an interface to a camera network (3) for video surveillance of a surveillance area (2), wherein the camera network (3) comprises a plurality of cameras (3a, b), each for capturing a surveillance subarea (2a, b) of the surveillance area (2), wherein the plurality of cameras (3a, b) are designed to provide surveillance images (6a, b) of the surveillance subareas (2a, b),
comprising a surveillance device (5) for re-identifying people (4) in the surveillance images (6a, b), wherein the surveillance device (5) comprises a person detection module (9), which person detection module (9) is designed to detect people (4) in the surveillance images (6a, b), wherein the surveillance device (5) comprises an object detection module (10), which object detection module (10) is designed to detect objects (8) in the surveillance images (6a, b), which detection involves obtaining object information for the detected objects (8), wherein the surveillance device (5) comprises an assignment module (12), which assignment module (12) is designed to assign at least one item of object information to a person (4),
wherein
the surveillance device (5) comprises an action detection module (11), wherein the action detection module (11) is designed to detect an action of the person (4) on an object of the detected objects (8), wherein the assignment module (12) is designed to, when at least one action condition is satisfied, assign object information for the object (8) to the person (4) for re-identification, wherein the surveillance device (5) comprises a comparison module (13), wherein the comparison module (13) is designed to compare the assigned object information from a plurality of different surveillance subareas (2a, b), wherein the person (4) is re-identified in the surveillance images (6a, b) when there is a match for the assigned object information from at least two surveillance subareas (2a, b).

2. The surveillance system (1) according to claim 1, wherein the assignment module (12) is designed to assign to the people (4) different object information from one or more surveillance subareas (2a, b), wherein the comparison module (13) is designed to compare the people (4) using the assigned object information, wherein the person (4) is re-identified as the same person when there is a match for the assigned object information.

3. The surveillance system (1) according to claim 1, wherein the at least one action condition comprises an action of the person (4) on the object (8) that results in the object (8) accompanying the person (4) across at least two different surveillance subareas (2a, b).

4. The surveillance system (1) according to claim 1, wherein the object information comprises at least one position feature and/or identification feature of the object (8).

5. The surveillance system (1) according to claim 1, wherein the assignment module (12) is designed to assign to precisely one person (4) a plurality of items of object information from different surveillance subareas (2a, b).

6. The surveillance system (1) according to claim 1, wherein the person detection module (9) is designed to extract at least one item of person information for the person (4) from the surveillance images (6a, b), and to provide the person information for re-identifying the person.

7. The surveillance system (1) according to claim 6, wherein the person information comprises an appearance feature and/or a clothing feature and/or a motion feature of the person.

8. A method for re-identifying people (4) in surveillance images (6a, b), in which method:
people (4) are detected in the surveillance images (6a, b);
objects (8) are detected in the surveillance images (6a, b), which detection of the objects (8) involves obtaining object information for the detected objects;
an action of a person (4) on an object of the detected objects (8) is detected;
when at least one action condition is satisfied, object information for the object (8) is assigned to the person (4) for re-identification;
the assigned object information from a plurality of different surveillance subareas (2a, b) is compared; and
when there is a match for the assigned object information from at least two different surveillance subareas (2a, b), the person (4) is re-identified in the surveillance images (6a, b).

9. The method according to claim 8, wherein at least one item of person information for the person (4) is extracted from the surveillance images (6a, b), which person information is provided for re-identification of the person (4).

10. The method according to claim 9, wherein the person (4) is tracked in the surveillance images (6a, b) by matching the object information and/or the person information from at least two different surveillance subareas (2a, b).

11. A surveillance device (5) for re-identifying people (4) in the surveillance images (6a, b), which surveillance device is configured to perform the method according to claim 8, wherein the surveillance device (5) comprises a person detection module (9), which person detection module (9) is designed to detect the people (4) in the surveillance images (6a, b), wherein the surveillance device (5) comprises an object detection module (10), which object detection module (10) is designed to detect the objects (8) in the surveillance images (6a, b), which detection involves obtaining object information for the detected objects (8), wherein the surveillance device (5) comprises an assignment module (12), which assignment module (12) is designed to assign at least one item of object information to the person (4),
wherein
the surveillance device (5) comprises an action detection module (11), wherein the action detection module (11) is designed to detect the action of the person (4) on the object (8), wherein the assignment module (12) is designed to, when the at least one action condition is satisfied, assign the object information for the object (8) to the person (4) for re-identification.

12. A non-transitory computer-readable storage medium storing instructions that, when executed by an electronic processor, perform a set of functions, the set of functions comprising:
detecting people (4) in the surveillance images (6a, b);
detecting objects (8) in the surveillance images (6a, b), wherein detecting objects (8) in the surveillance images (6a, b) includes obtaining object information for the detected objects;
detecting an action of a person (4) on an object of the detected objects (8);
when at least one action condition is satisfied, assigning object information for the object (8) to the person (4) for re-identification;
comparing the assigned object information from a plurality of different surveillance subareas (2a, b); and
when there is a match for the assigned object information from at least two different surveillance subareas (2a, b), re-identifying the person (4) in the surveillance images (6a, b).

* * * * *